United States Patent [19]

Hinkleman

[11] Patent Number: 4,655,412

[45] Date of Patent: Apr. 7, 1987

[54] AIRFOIL HAVING IMPROVED LIFT CAPABILITY

[75] Inventor: Michael J. Hinkleman, Kent, Wash.

[73] Assignee: The Boeing Company, Seattle, Wash.

[21] Appl. No.: 574,850

[22] PCT Filed: Jan. 16, 1984

[86] PCT No.: PCT/US84/00071

§ 371 Date: Jan. 16, 1984

§ 102(e) Date: Jan. 16, 1984

[87] PCT Pub. No.: WO85/03051

PCT Pub. Date: Jul. 18, 1985

[51] Int. Cl.[4] .................................................. B64C 3/14
[52] U.S. Cl. .................................................. 244/35 R
[58] Field of Search .................... 244/35 R, 35 A, 198, 244/200

[56] References Cited

U.S. PATENT DOCUMENTS

| | | | |
|---|---|---|---|
| 1,780,838 | 11/1930 | Page | 244/210 |
| 2,257,260 | 9/1941 | Kartvelichvili | 244/35 |
| 2,448,698 | 9/1948 | Biot et al. | 235/61 |
| 2,541,565 | 2/1951 | Ziegler | 244/42 |
| 2,793,826 | 5/1957 | Fiedler | 244/43 |
| 2,938,680 | 5/1960 | Greene et al. | 244/42 |
| 3,077,173 | 2/1963 | Lang | 114/66.5 |
| 3,195,836 | 7/1965 | Alvarez-Calderon | 244/42 |
| 3,244,384 | 4/1966 | Bracka et al. | 244/42 |
| 3,273,826 | 9/1966 | Jackson | 244/42 |
| 3,917,193 | 11/1975 | Runnels, Jr. | 244/42 |
| 3,952,971 | 4/1976 | Whitcomb | 244/35 |
| 4,050,651 | 9/1977 | Neal et al. | 244/15 |
| 4,121,787 | 10/1978 | Wilby | 244/35 R |
| 4,189,120 | 2/1980 | Wang | 244/214 |
| 4,200,253 | 4/1980 | Rowarth | 244/219 |
| 4,240,597 | 12/1980 | Ellis et al. | 244/35 R |
| 4,240,598 | 12/1980 | Vinas Espin et al. | 244/35 |
| 4,413,796 | 11/1983 | Bousquet | 244/35 R |
| 4,416,434 | 11/1983 | Thibert et al. | 244/35 R |
| 4,455,003 | 6/1984 | Hilbig | 244/35 R |

FOREIGN PATENT DOCUMENTS

| | | |
|---|---|---|
| 0048649 | 3/1982 | European Pat. Off. . |
| 0076936 | 4/1983 | European Pat. Off. . |
| WO81/02557 | 9/1981 | World PCT Int'l Appl . |
| 127898 | 6/1919 | United Kingdom ............. 244/35 R |
| 452366 | 8/1936 | United Kingdom ............. 244/35 R |

OTHER PUBLICATIONS

"Computer-Aided Design: Aerodynamics", by A. B. Haines, pp. 81-91, *Aeronautical Journal*, Mar. 1979.

NASA TM X-3293, "Effects of Forward Contour Modification on the Aerodynamic Characteristics of the NACA 64,-212 Airfoil Section", Raymond M. Hicks, et al., Sep. 1975, pp. 1-8.

*Primary Examiner*—Trygve M. Blix
*Assistant Examiner*—Rodney Corl
*Attorney, Agent, or Firm*—Eugene O. Heberer

[57] ABSTRACT

An airfoil (10) having improved life capability and having airfoil curves including a camber divided into three regions I, II and III. Region I has a starting point aft and adjacent a leading edge (12) and encompasses the airfoil stagnation point. Region I has a high curvature around the leading edge and decreases aft along the chord to a first local minimum value of less than 3 for K times C, where C is the length of the chord and K is the reciprocal of the local radius of curvature. The curvature region II starts at the after end of region I within 10% of the chord length and the curvature in region II first increases from the first local minimum at the aft end of region I and then decreases to a second local minimum within 40% of the chord length.

2 Claims, 13 Drawing Figures

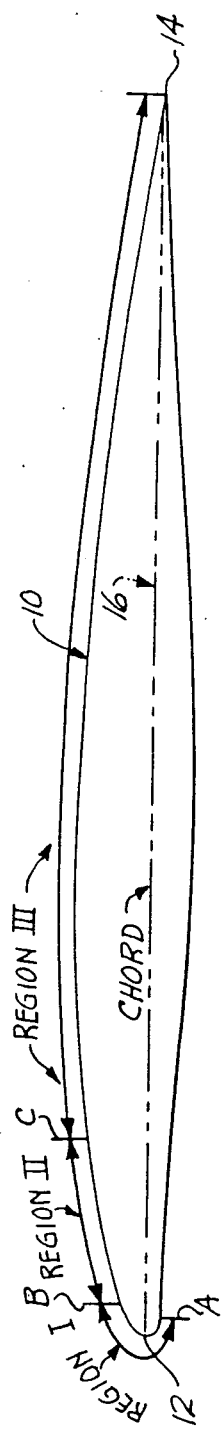
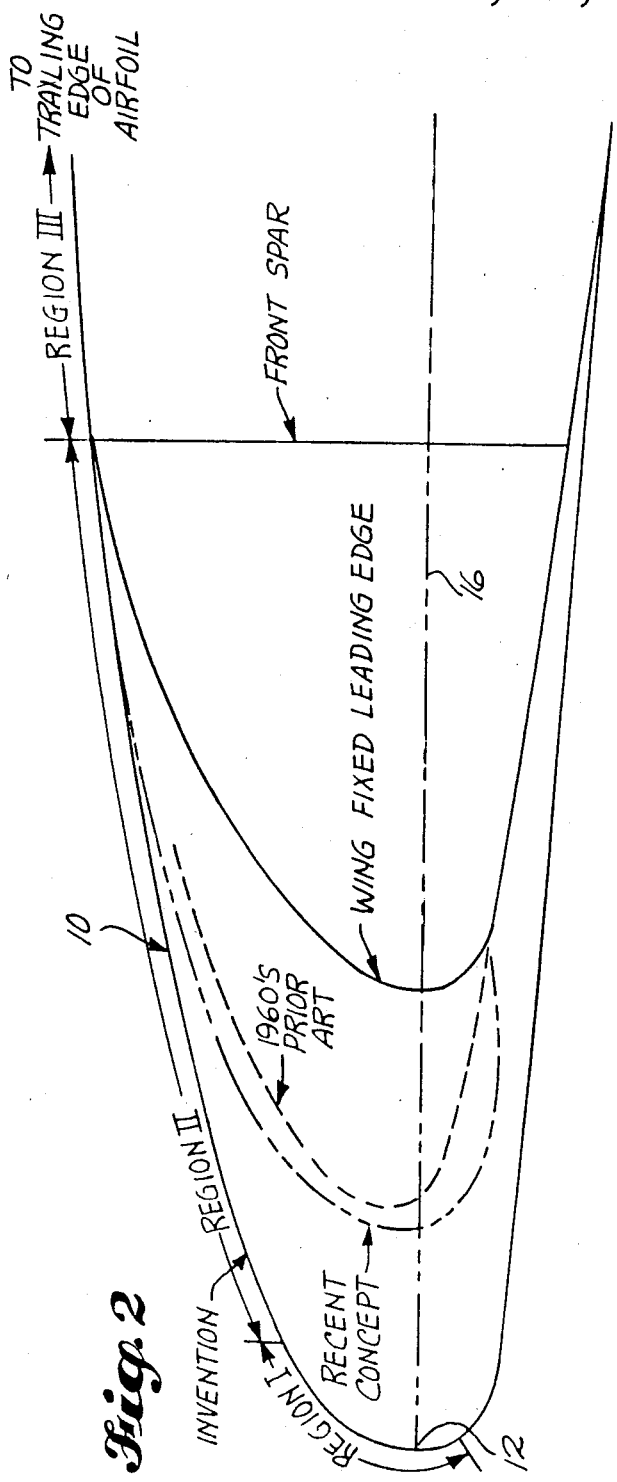

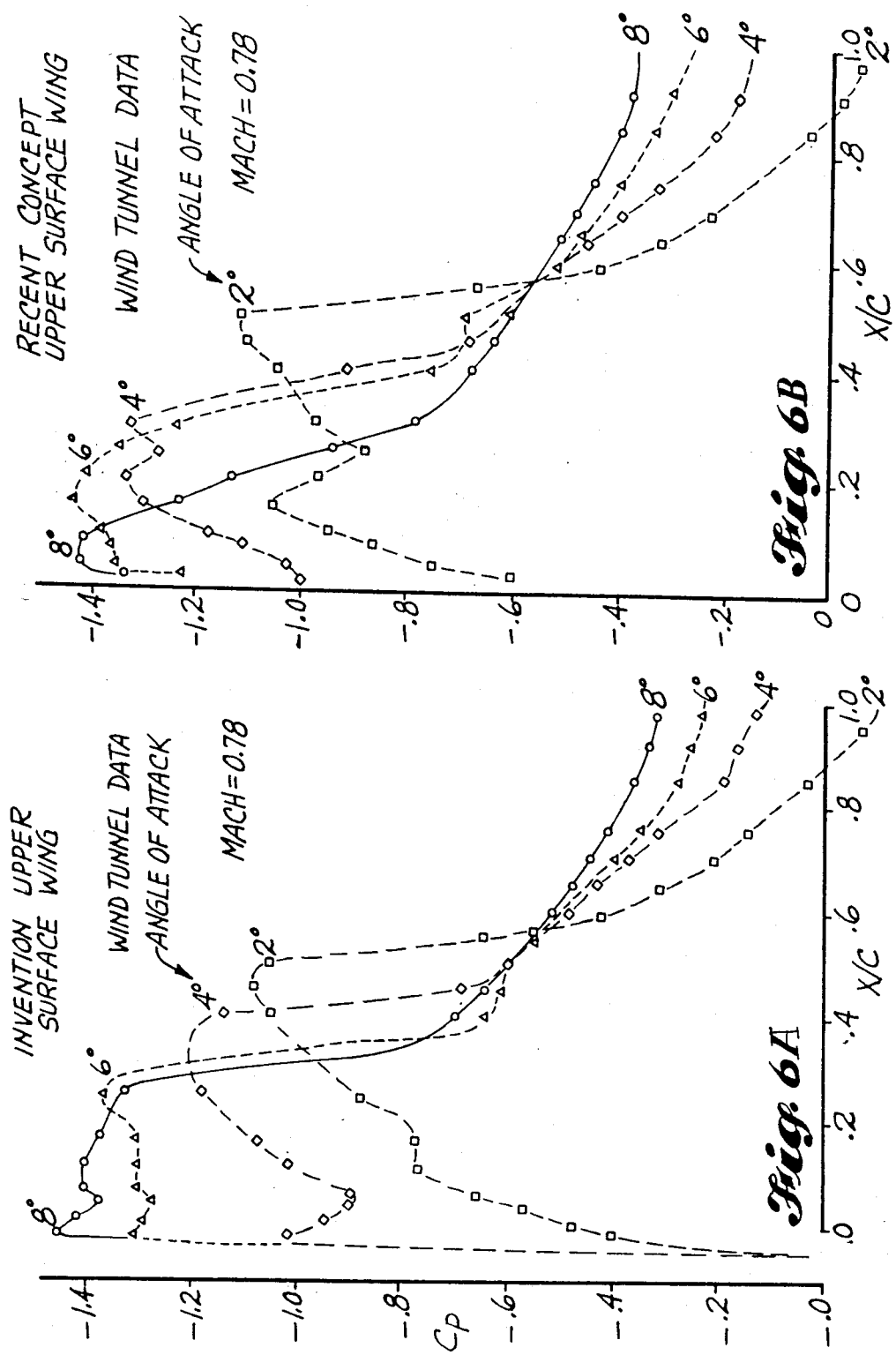

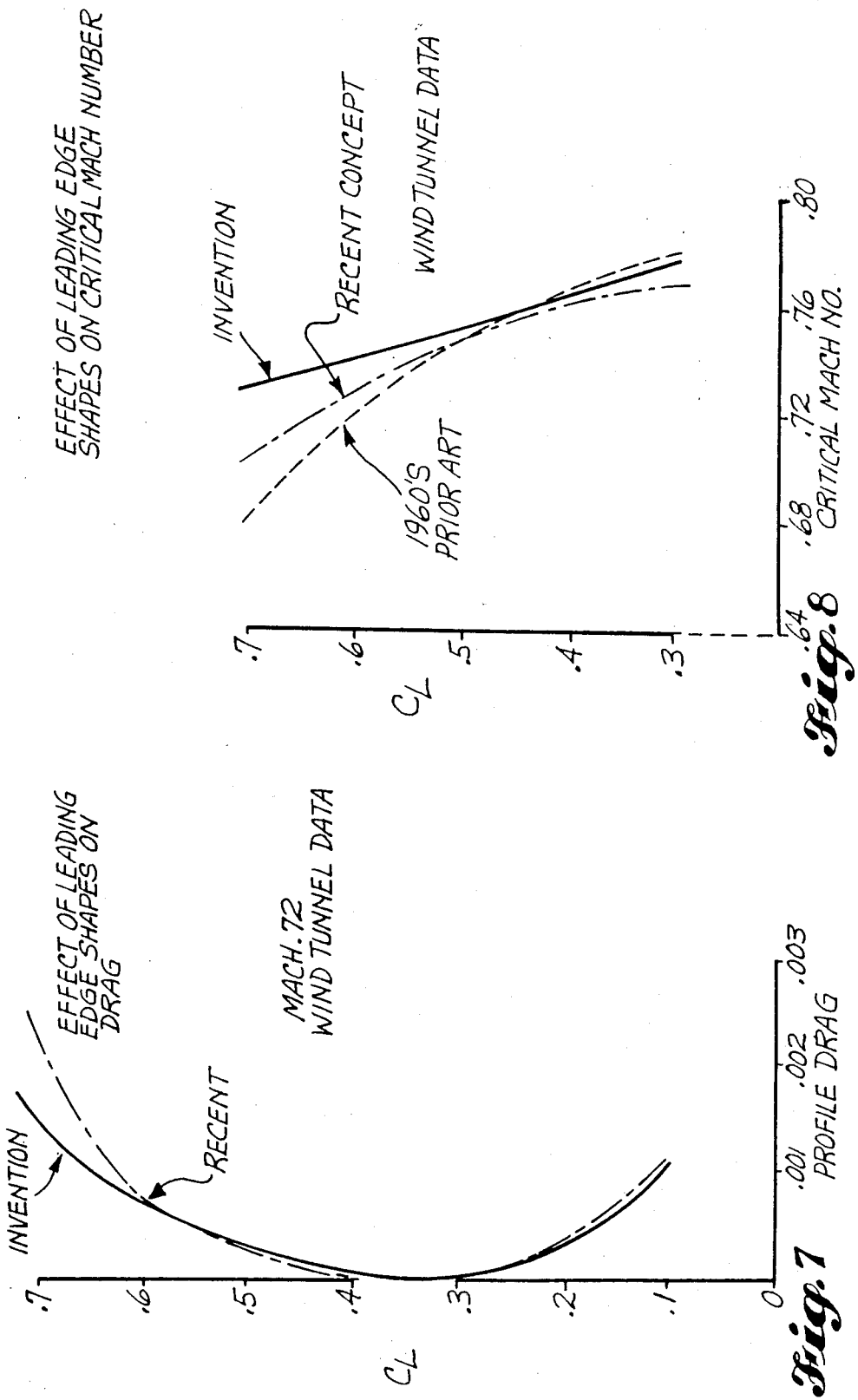

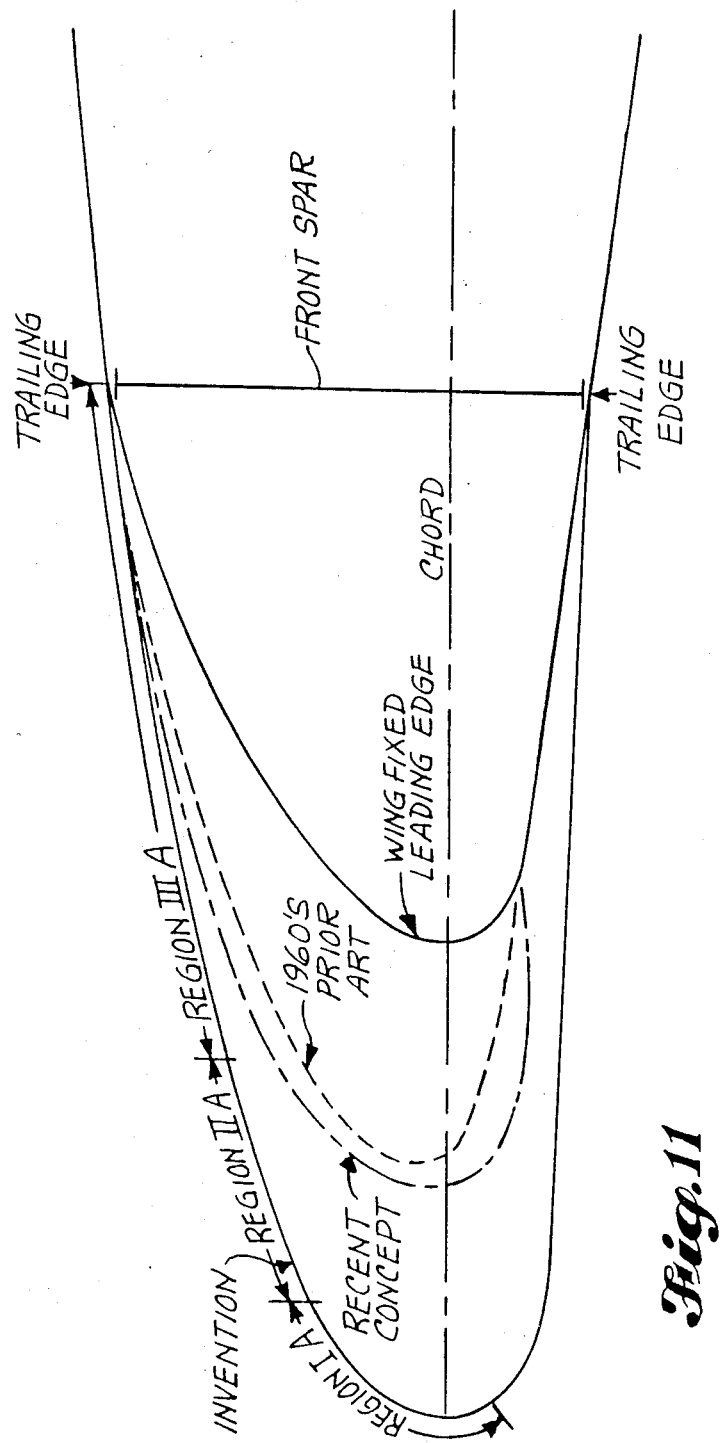

AIRFOIL HAVING IMPROVED LIFT CAPABILITY

TECHNICAL FIELD

The invention relates to an airfoil and more particularly, to the leading edge of an airfoil having high lift capability.

BACKGROUND ART

In the design of an airfoil forming an aircraft wing, particularly, the leading edge thereof on a fixed wing or in the form of a leading edge comprising a movable slat on a fixed wing, within a required parameter or envelope, it is attempted to improve the lift capability, reduce the pitch-up, reduce the cruise drag, and improve the buffet in comparison with the prior art. Typically, aircraft wings have been shaped to provide a required lift with least possible cruise drag. The shape of the wing is generally comprised between the aerodynamic shape that is most efficient for aircraft cruising speed and the aerodynamic shape required for low air speeds such as encountered during takeoff and landing. It is also known that reduction in pitch-up generally penalizes cruise drag performance.

A search of the patent literature discloses the following patents, International Application, and article, which are of general interest:

U.S. Pat. No. 1,780,838
U.S. Pat. No. 2,257,260
U.S. Pat. No. 2,448,698
U.S. Pat. No. 2,541,565
U.S. Pat. No. 2,793,826
U.S. Pat. No. 2,938,680
U.S. Pat. No. 3,077,173
U.S. Pat. No. 3,195,836
U.S. Pat. No. 3,244,384
U.S. Pat. No. 3,273,826
U.S. Pat. No. 3,917,193
U.S. Pat. No. 3,952,971
U.S. Pat. No. 4,050,651
U.S. Pat. No. 4,189,120
U.S. Pat. No. 4,200,253
U.S. Pat. No. 4,240,598
International Application published under P.C.T. International Pub. No. WO 81/02557, International Pub. Date Sept. 17, 1981
Article: "Computer-aided design: Aerodynamics, by A. B. Haines, pps. 81-91, Aeronautical Journal, March 1979

DISCLOSURE OF THE INVENTION

The present invention provides for improved low-speed handling and high-speed performance in slats or in a fixed leading edge airfoil on airplane wings or in stabilizers, for example.

According to the present invention, an airfoil was developed to increase lift capability, particularly at Mach numbers from 0.72 to 0.84, and improve the load balance of the wing at high angles of attack.

The unique geometric configuration, according to the invention, also was found to substantially reduce pitch-up without penalizing cruise drag performance.

Generally, the airfoil may be described as having multiple local curvature minima on the upper or negative pressure surface. The airfoil according to the invention when used as a stabilizer would generally have the geometric configuration on the lower surface, an exception being the case of an uncambered stabilizer for which both upper and lower surfaces would be identical.

The airfoil has curves including camber divided into first, second, and third curve portions or three regions, I, II, and III. Region I has a starting point aft and adjacent the leading edge and encompasses the airfoil stagnation point. It has a high curvature around the leading edge and the curvature decreases aft measured along the chord from the leading edge on an upper or negative pressure side of the airfoil to a first local minimum value of less than 3 for K times C at the end of region I, where C is the length of chord and K is the reciprocal of the local radius of curvature. Region I is within 10% of the chord length and region II starts at the aft end of region I within 10% of the chord length. The curvature in region II first increases from the first minimum and then decreases to a second local minimum within 40% of the chord length.

The starting point of region I is below the chord, lower than the ordinate value of the leading edge, and is aft of the leading edge by not more than 3% of chord length measured along the chord. The high curvature at the leading edge has a value for K times C equal to or greater than 35 but less than or equal to 120. In region II the maximum value for K times C is greater than 1 but less than 6.

The second local minimum is at the end of region II and the value of K times C initially increases from the second local minimum and after the increase, may remain constant to the trailing end of the airfoil or may have one or more greater points relative to the first and second minimums.

Within the required parameter the airfoil, according to the invention, is considered to be the first to provide pitch-up improvement without penalizing cruise drag performance. It provides a substantially greater lift and improved buffet to permit the aircraft to carry substantially higher weights.

Further advantages of the invention may be brought in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes:

FIG. 1 is a profile view of an airfoil, according to the invention, the invention being substantially in the upper surface of the airfoil;

FIG. 2 is an enlarged profile view of the invention as it may be applied to a wing fixed leading edge in the form of a slat or in the form of the leading edge as a part of a wing and integral therewith; shown for comparison with the invention is a prior art leading edge of the 1960's and a recent leading edge concept which is not prior art;

FIGS. 6A and 6B are a graph for the invention and a graph for the recent concept in which pressure coefficient is plotted against the distance from the leading edge measured aft on the chord and divided by the length of the entire chord at various angles of attack;

FIG. 7 is a graph in which the lift coefficient is plotted against profile drag, comparing the invention with the recent concept to show the effect of leading edge shapes on drag;

FIG. 8 is a graph in which the lift coefficient is plotted against critical Mach number and shows comparison of the effect of leading edge shapes of the 1960's prior art, the recent concept, and the invention;

FIG. 11 is a view illustrating the configuration of the invention in the form of a leading edge slat along with applicant's recent concept, and the 1960's prior art.

BEST MODE FOR CARRYING OUT THE INVENTION

Referring again to the drawings, the invention is shown in the airfoil 10, shown as the profile of a wing, and being substantially in the upper surface starting at point A to include the stagnation point, extending around leading edge 12, and terminating in the trailing edge 14 of the airfoil and wing. Airfoil chord 16 is shown in phantom lines extending from the leading edge to the trailing edge.

Figure 3:
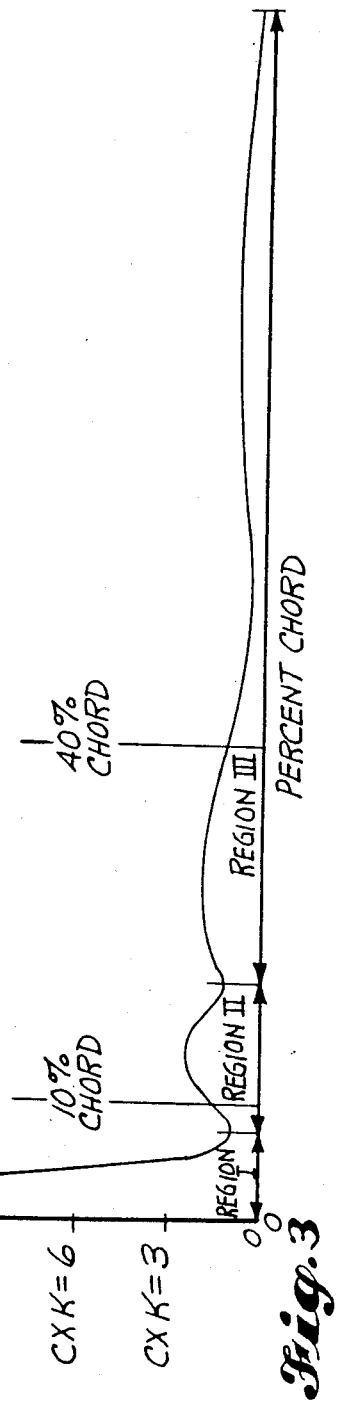
FIG. 3 is a graph illustrating curvature (K) times chord length plotted against percent chord, illustrating the invention in graph form.

Region I of the airfoil, extending between points A and B, extends below the upper surface far enough to encompass the airfoil stagnation point. Point A is thus lower than the ordinate value of the leading edge 12 and is aft of the leading edge by no more than 3% of the chord distance as measured along the chord. The airfoil leading edge has curvature (K) times chord length (C) equal to or greater than 35 but less than or equal to 120, FIGS. 3 and 5, where K is the reciprocal of the local radius of curvature. Region I has a minimum of curvature, K times C, of less than 3 at its end, point B, and the start of region II. As best seen in FIG. 3, region I has a continuously decreasing curvature to a minimum within the first 10% of the airfoil as measured along the chord.

Point B at the end of region I lies aft of the leading edge and within 10% of the chord length on the upper surface of the airfoil.

The forward or first local minimum point of curvature B, FIG. 3, is a significant aspect of the inventive leading edge shape. After point B the curvature first increases then decreases to a second local minimum value occurring within the first 40% of the airfoil, the second local minimum value being at point C at the end of region II and the start of region III. In region II the maximum value for K times C is geater than 1 but less than 6.

Figure 5:
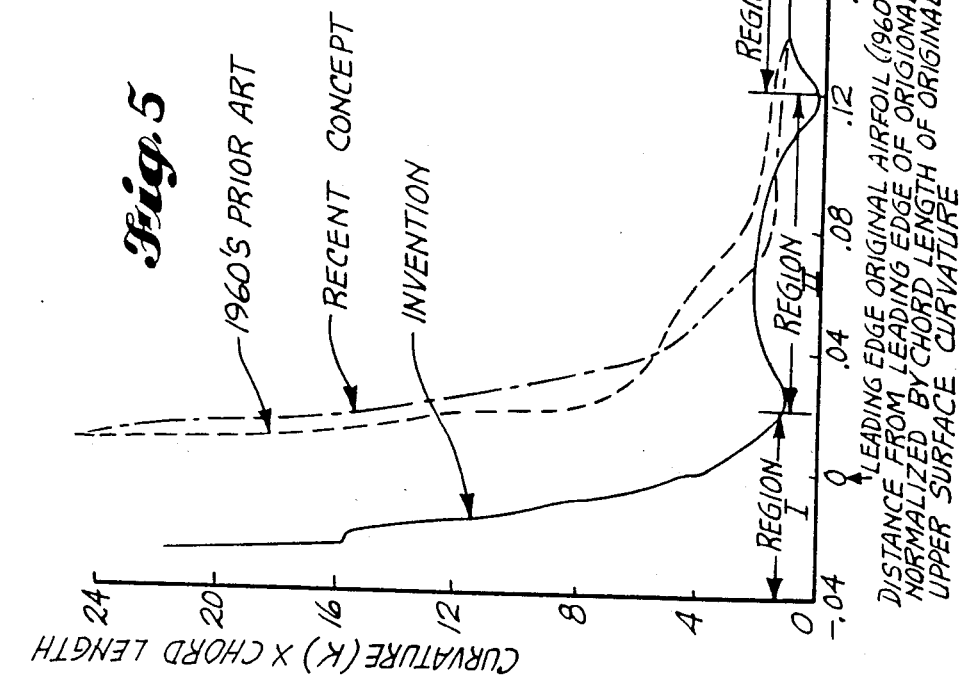
FIG. 5 is a graph illustrating curvature, K times C, plotted against distance from the leading edge prior art airfoil normalized by chord length for comparison of the 1960's prior art, a recent concept, and the invention.

As shown in FIG. 3, region I plus region II are within the first 40% of the chord, and point C, FIG. 1, lies aft and within 40% chord of the leading edge of the upper surface of the airfoil. The curvature of region III initially increases from the second local minimum at the end of region II and after the increase may remain at a constant level or may have one or more maximum/minimum points, as indicated in FIGS. 3 and 5. Region III is about twice the length of region II.

From the foregoing, it is noted that the overall airfoil upper surface has at least two local curvature minima, both occurring within the first 40% of the chord length.

In FIG. 2, the invention is shown along with the profile of prior art, in broken lines, developed in the 1960's and with a recent airfoil concept, in phantom lines, of applicant which is not prior art. The wing fixed leading edge illustrates an airfoil on which the invention, the recent concept and the prior art would be suitable for employment as slats. The three profiles forming leading edges forwardly of the fixed leading edge could also be employed as airfoils forming a fixed leading edge on a wing.

Figure 4A:
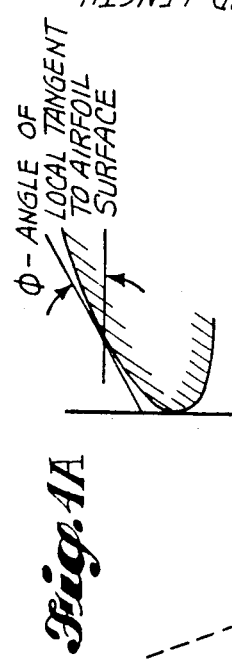
FIG. 4A illustrates the position of angle phi in FIG. 4.
Figure 4:
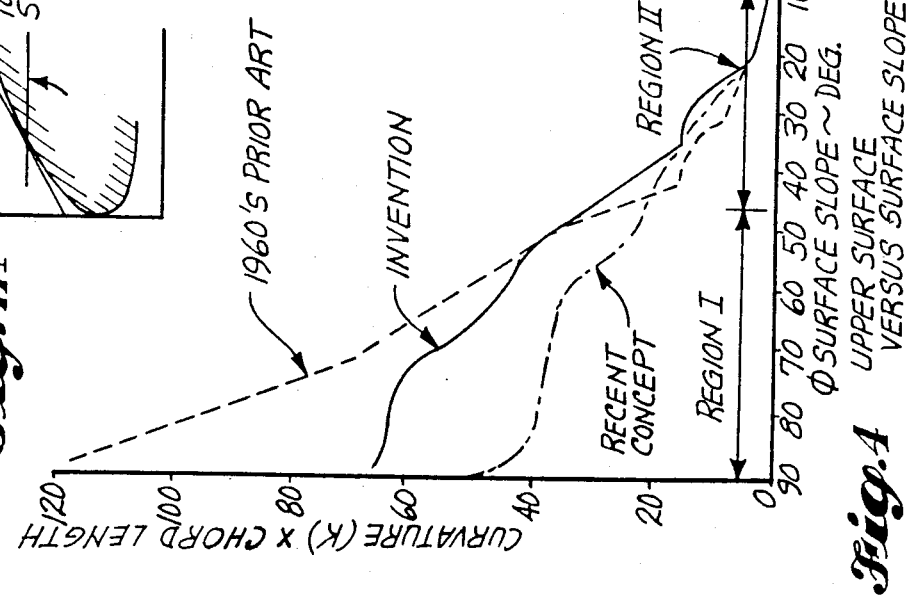
FIG. 4 shows a comparison of the curvature, K times C, of the three profiles illustrated in FIG. 2.

In FIG. 4, the nose curvature, K times C, of the three airfoils is illustrated. FIG. 4A shows the position of the angle phi. The prior art curve shows curvature typical of older technology airfoils whereas the recent concept curve is similar to some of the current state of the art (peaky-type) airfoils. The curve showing the invention has a nose curvature that falls between the other two and the graph shows the substantial distinction.

In FIG. 5 curvature is plotted against the distance from the leading edge of the prior art airfoil normalized by chord length. The forward minimum point of curvature of the invention illustrates the distinction between the prior art, the recent concept. The curvature of the recent concept, which is less than that of the prior art from 4% to 12% chord, does not reach a true minimum until the crest of the main airfoil, although it is almost constant from about 25% chord length to the crest.

The net effect of the varying curvature regions of the inventive leading edge is illustrated in FIG. 6, where outboard upper wing pressures at Mach 0.78 on the invention and of the recent concept are shown. As the angle of attack increases from 2° to 8°, the character of the pressure distribution of the new airfoil changes from non-peaky (almost no leading edge suction) to peaky (a roof-top shape with suction all the way up to the leading edge). The pressure distribution in the invention fills out about the forward minimum curvature point near 5% chord. In a like manner, the recent concept airfoil distribution fills out about its effective minimum curvature point, which is about 25% chord. This is significant because the recent concept airfoil carries additional lift with angle of attack, the shock strength near the airfoil crest growing faster than it does on the invention airfoil. The trailing edge pressures correspondingly are more positive on the invention than on the recent concept, indicating a thinner shed wake for the invention airfoil. At 8° angle of attack, the presure distribution in the recent concept airfoil has effectively collapsed due to shock-induced separation while the inventive airfoil distribution is still reasonably well formed due to the first and second local minimum values at less than 40% chord.

Figure 10:
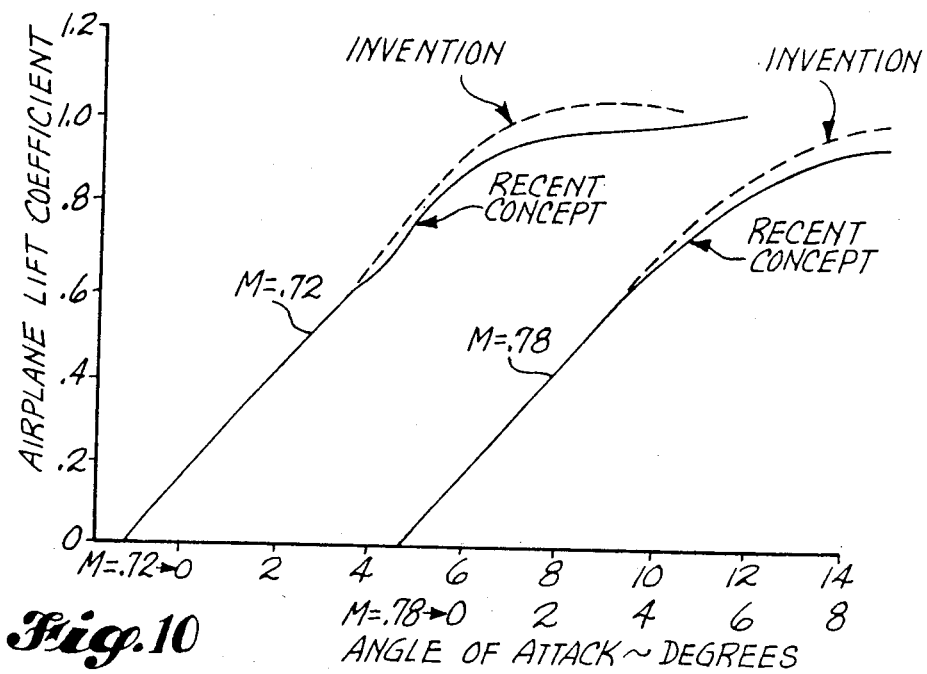
FIG. 10 is a graph of airplane lift coefficient plotted against the degrees of angle of attack for Mach point 0.72 and Mach 0.78, illustrating the improvement of lift in the invention over applicant's recent concept.

As shown in FIG. 10, for Mach numbers ranging from 0.72 to 0.78 the effect of the inventive leading edge on wing pressures is virtually the same, resulting in delayed shock-induced stall of the wing, shown in FIG. 6 for angles of attack of 6° and 8°. The lift improvement shown in FIG. 10 in the invention with respect to the recent concept is substantial.

Figure 9:
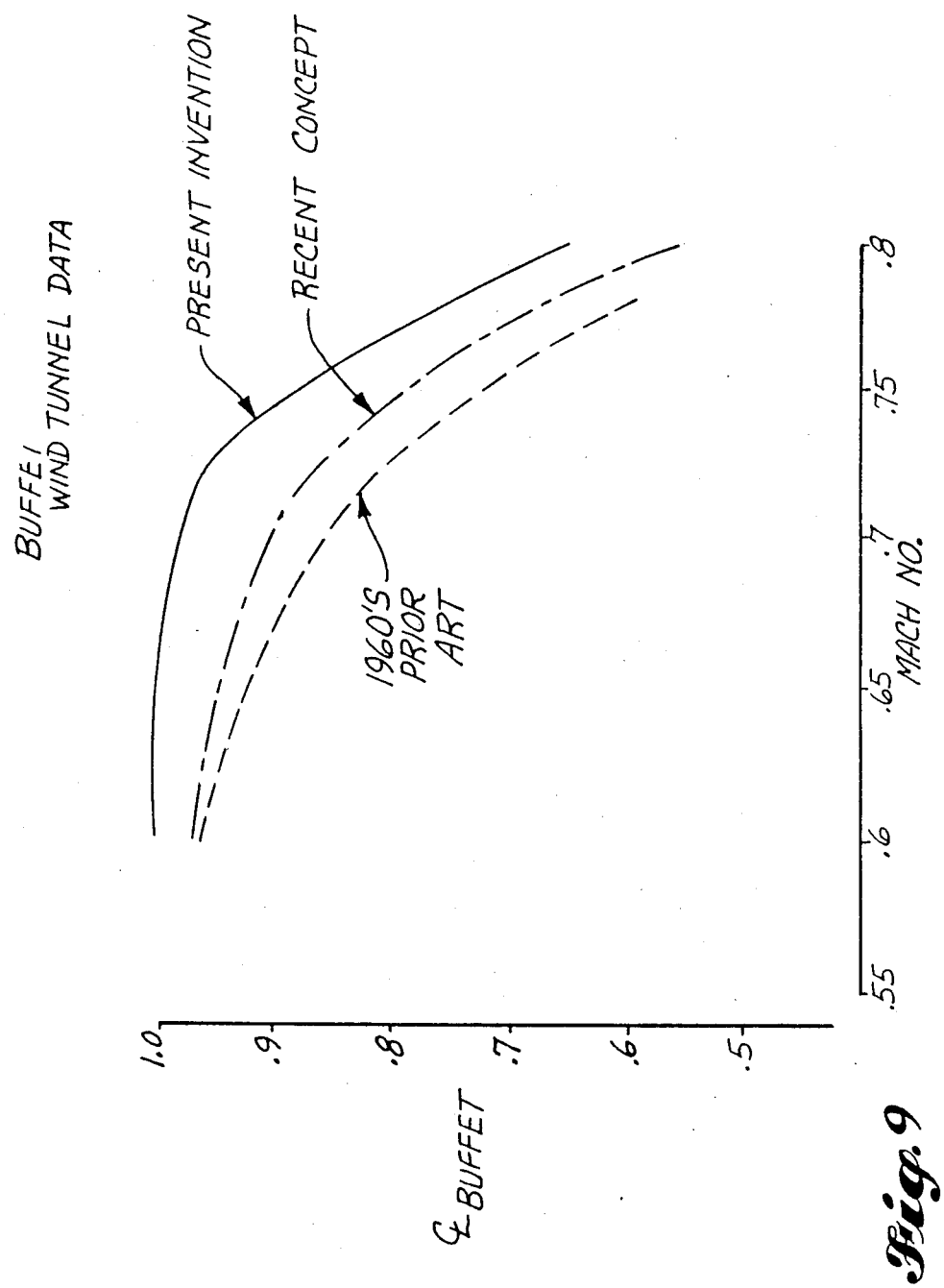
FIG. 9 is a graph illustrating the lift coefficient buffet plotted against the Mach number in which curves for the present invention, recent concept, and the 1960's prior art are compared.

The delayed shock stall, FIG. 6, with the present invention also significantly improved the buffet boundary, FIG. 9, compared with the recent concept and the prior art.

As shown in FIG. 7, from a drag standpoint, the leading edge of the invention is the same or better than the recent concept. In FIG. 7 and 8, comparisons of the Mach 0.72 (cruise) drag polar and the critical Mach number with the invention and recent concept are made and also with the prior art relative to the critical Mach number.

The fact that the present invention performs well at high lift values is obvious and what is more important, is that there is no performance trade-off with the inventive leading edge at lower lift values.

In summary, the inventive leading edge opens up the Mach/lift operating envelope in the lift direction. The Mach number capability at low lift values, where the leading edge shape plays a less significant role, was not affected. It is expected that the present invention can be used to open up the Mach/lift boundary of any given airfoil. This is certainly true of the older technology airfoils on nearly all commercial airplanes flying today. The new leading edge invention will also improve the off-design (lower Mach number) performance of a point designed peaky-type airfoil.

FIG. 11 illustrates the invention of the airfoils in the position and configuration of slats, rather than as an entire wing for complete airfoil, shown in FIGS. 1 and 2. The curves in regions IA, IIA and IIIA can be made to apply to the graphs in the same manner as regions I, II and III.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to specific forms shown or uses mentioned except as defined in the accompanying claims.

What is claimed is:

1. An airfoil having improved lift capability, comprising:

a chord extending from a leading edge to a trailing edge of the airfoil;
 a first airfoil curve portion having a high curvature around the leading edge, and having curvature decreasing aft along the chord from the leading edge on upper or negative pressure side of the airfoil to a first local minimum value of less than 3 for K times C,
 where C is the length of chord and K is the reciprocal of the local radius of curvature;
 a second curve portion extending from the first minimum and increasing and then decreasing to a second local minimum within 40% of the chord length;
 the starting point of the first portion being below the chord, lower than ordinate value of the leading edge, and being aft of the leading edge by not more than 3% of chord length measured along the chord;
 the high curvature at the leading edge having a value for K times C equal to or greater than 35 but less than or equal to 120;
 a third curve portion starting at the end of the second portion within 40% of the chord length and extending to the trailing edge of the chord;
 the maximum value for K times C in the second portion being greater than one but less than 6;
 the second local minimum being at the end of the second portion and the beginning of the third portion;
 the value of K times C initially increases from the second local minimum and then decreases before the trailing end of the airfoil;
 the value of K times C increases from the second local minimum and the third portion has at least one greater value of K times C relative to the first and second minimums;
 the first portion being within 10% of the chord length; and
 the second portion starting at the aft end of the first portion within 10% of the chord length.

2. In an airfoil, a leading edge portion having improved lifting capability, comprising:

a chord extending from a leading edge of a leading portion of an airfoil to a trailing end of the portion;
 a first region of the portion having a high curvature around the leading edge, and curvature decreasing aft along the chord from said leading edge of the portion on at least one side of the airfoil to a first local minimum value of less than 3 for K times C,
 where C is the length of chord and K is the reciprocal of the local radius of curvature;
 a second region of the portion extending from the first minimum and increasing and then decreasing to a second local minimum within 40% of the chord within the portion;
 the starting point of the first region being on the other side of the chord, and being aft of the leading edge of the portion by not more than 3% of the chord length measured along the chord of said portion;
 the high curvature at the leading edge of the portion has a value for K times C equal to or greater than 35 but less than or equal to 120;
 a third region of the portion starts at the end of the second region within 40% of the chord length within the portion;
 the maximum value for K times C in the second region being greater than 1 but less than 6;
 the third region extends to the trailing edge of the portion;
 the second local minimum being at the end of the second region and the beginning of the third region;
 the value of K times C increasing from the second local minimum and the third region having at least one greater value of K times C relative to the first and second minimums;
 the length of the third region along the chord being at least twice as long as the second region;
 the first region being within 10% of the chord length; and the second region starting at the aft end of the first region within 10% of the chord length.

* * * * *